Dec. 9, 1930.   L. A. MEKLER   1,784,301
MASSAGING DEVICE
Filed Dec. 9, 1927
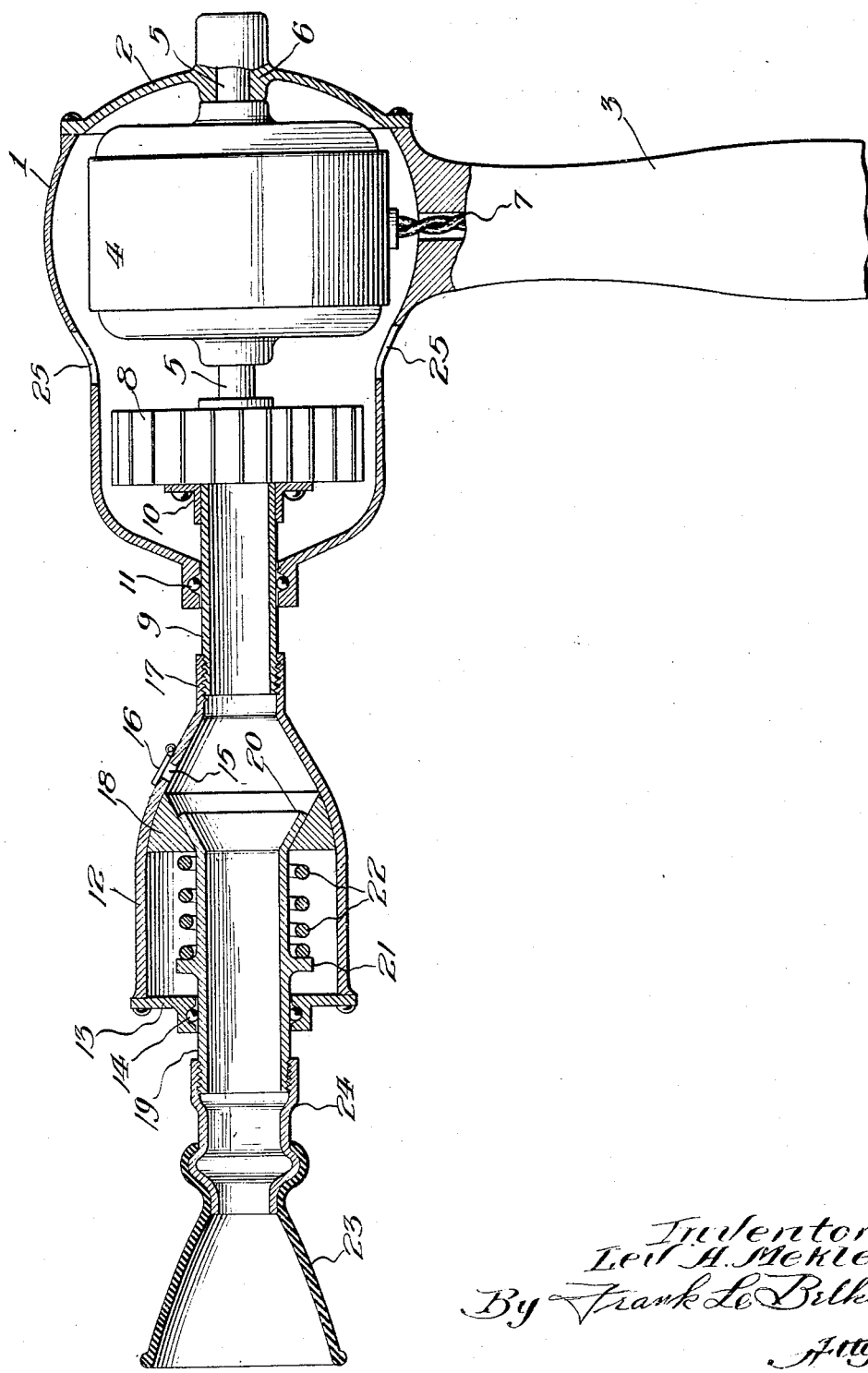
Inventor:
Leo A. Mekler,
By Frank Le Belkus
Atty.

Patented Dec. 9, 1930

1,784,301

UNITED STATES PATENT OFFICE

LEV A. MEKLER, OF CHICAGO, ILLINOIS

MASSAGING DEVICE

Application filed December 9, 1927. Serial No. 238,790.

The present invention relates to improvements in a device for massaging, and more particularly to a device for facial massaging and the like.

At the present time, many types of massaging devices enjoy wide usage. Certain of these, particularly those adapted for facial use, have a soft massaging element which is caused to rotate while in contact with the skin of the subject, thus stimulating the circulation of blood beneath the skin. A cup shaped member may also be attached to such devices and caused to oscillate rapidly against the skin to open and clean the pores. When the actuating mechanism is regulated to cause oscillation of the cup, the cup is not caused to rotate. Were it rotated and oscillated at the same time, the friction might be so great as to cause the cup to grip and twist the skin to such an extent as to cause injury.

An object of the present invention is to combine these two massaging operations into one, causing the skin to be subjected to both the rotating action of the rotating massager and a substantially constant suction effect similar to that of the oscillaing cup shaped massager.

A further object is to control independently of each other the force of the suction and the rotation of the massaging element.

Other objects, features and advantages will be more particularly apparent from the following detailed description.

The drawing is a view partly in section, of an apparatus built in accordance with the present invention.

Referring more in detail to the drawing, a metal housing 1 having a removable end plate 2 and a handle 3 may be provided. An electric motor, diagrammatically illustrated at 4, having an armature shaft 5, journalled in a bearing 6, may be disposed within the housing 1. Suitable wires 7 may be provided to connect the motor with a suitable source of electric current. A rotary type blower or fan, diagrammatically shown at 8, may be suitably keyed to the armature shaft 5 and fixedly attached to a hollow shaft 9 by means of an annular collar 10. A bearing 11 may be provided in the housing 1 for the shaft 9. A clutch casing 12 having an end plate 13, a bearing 14, and an aperture 15 provided with a cover 16, may be provided and suitably connected, for instance by means of a threaded coupling 17, to the shaft 9. An annular clutch seat 18 may be disposed within the housing 12. A hollow shaft 19 having a clutch cone 20 and a flange 21 may be disposed within the clutch casing 12 and journalled in the bearing 14. A compression spring 22 may be provided, between the flange 21 and the clutch seat 18, of a strength sufficient to normally force the clutch cone 20 into engagement with the seat 18. A hollow cup shaped massager 23, of suitable material such for instance as rubber, may be attached to the hollow shaft 19 by means of a coupling 24.

In the operation of the device, a suitable supply of electric current may be conducted to the motor 4 through wires 7, causing the motor to function and rotate the entire assembly mounted on the shafts 5, 9 and 19, including the fan 8, the clutch casing 12, the clutch cone 20, the coupling 24 and the massaging element 23. The aperture 15 being closed by the cap 16, the fan 8 will draw air through the passageway formed by the massager 23, the coupling 24, and hollow shaft 19, discharging it through the apertures 25 in the motor housing 1. The rotating massager 23 may be pressed against the skin of the subject with sufficient force to compress spring 22 causing the shaft 19 to slide further into the housing 12 in turn causing the clutch cone 20 to disengage the seat 18. The disengagement of the clutch will cause shaft 19 to cease rotating as it is disconnected from the rest of the assembly, including the fan 8, which is still rotating, producing a sub-atmospheric pressure condition within the massager 23. By reducing the pressure with which the massager 23 is pressed against the skin of the subject, the clutch may be lightly engaged to cause the massager 23 to slowly rotate. Thus the rotation may be made intermittent by alternately increasing and decreasing the pressure with which the massager is applied.

If it is desirable to reduce the suction created by fan 8, the aperture 15 may be partially or entirely opened to allow air to enter the hollow passageway in shaft 9. If no suction whatever is desired, the aperture 15 may be completely opened to supply the fan 8 with the maximum amount of air it may demand. By so operating the device, it is made to function in a manner similar to the rotating massaging devices which operate without applying any suction to the skin.

It is to be understood that a hollow flexible shaft may be attached to the shaft 9 connecting the shaft 9 and the clutch assembly to permit the motor and fan to be mounted on a stand in a manner similar to the conventional type hair clippers. I may also employ a set of reduction gears between the massager 23 and the fan 8 to cause the massager 23 to rotate at a slower rate of speed than the shaft 5.

It is also to be understood that I may employ a system of levers or rods to engage and disengage the clutch.

I claim as my invention:

1. In a massaging device, the combination with a rotatable massaging element, of means for rotating said massaging element, and means permitting the disengagement of the said massaging element from said rotating means when the pressure against said massage element exceeds a predetermined amount.

2. In a massaging device, the combination with a rotatable massaging element, of means for rotating said massaging element, and means comprising a spring actuated clutch for permitting partial disengagement of said massaging element from said rotating means while a predetermined pressure is borne against said massaging element.

3. In a massaging device, the combination with a rotatable massaging element, of means for rotating said massaging element, means for creating a subatmospheric pressure within said massaging element, and means permitting the gradual disengagement of the said massaging element from said rotating means when a predetermined pressure is borne against said massaging element.

4. In a massaging device, the combination with a rotatable massaging element, of a fan adapted to create a subatmospheric pressure within said massaging element, means for rotating said massaging element, means for operating said fan, and means permitting the gradual disengagement of said massaging element from said rotating means when a predetermined increasing pressure is borne against said massaging element.

5. In a massaging device, the combination with a housing, of a rotatably driven shaft, a fan fixed to rotate with said shaft to create suction within said housing, a hollow shaft having cooperative connection to rotate with said first mentioned shaft, a hollow massaging element connected to the latter, said latter connection being loose and disengageable by force applied in pressing said massaging element against the skin to thereby interrupt the rotation of said massaging element.

6. In a massaging device, the combination with a housing, of a rotatably driven shaft, a fan fixed to rotate with said shaft to create suction within said housing, a hollow shaft having cooperative connection to rotate with said first mentioned shaft, a hollow massaging element connected to the latter, said latter connection being loose and disengageable by force applied in pressing said massaging element against the skin to thereby interrupt the rotation of said massaging element while maintaining suction through said hollow shaft and hollow massaging element.

7. In a massaging device, the combination with a housing, of a rotatably driven shaft, a fan fixed to rotate with said shaft to create suction within said housing, a hollow shaft, a massaging element mounted on said hollow shaft, the said shaft having cooperative connection to rotate with said first mentioned shaft through the medium of a spring tensioned clutch actuable by force applied in pressing said massaging element against the skin to disengage said clutch from said first mentioned shaft to thereby interrupt the rotation of said massaging element without interrupting the maintenance of suction through said hollow shaft and hollow massaging element.

8. In a massaging device, the combination with a housing, of a rotatably driven shaft, a fan fixed to rotate with said shaft to create suction within said housing, a hollow shaft having cooperative connection to rotate with said first mentioned shaft, a hollow massaging element connected to the latter, said latter connection being loose and disengageable by force applied in pressing said massaging element against the skin to thereby interrupt the rotation of said massaging element, said housing being provided with a valve controlled aperture for regulating the amount of suction imposed on the skin of the user.

9. In a massaging device, the combination with a housing, of a rotatably driven shaft, a fan fixed to rotate with said shaft to create suction within said housing, a hollow shaft having cooperative connection to rotate with said first mentioned shaft through the medium of a clutch, a massaging element mounted on said hollow shaft, a spring cooperatively associated with said clutch and said hollow shaft normally holding said clutch in position to rotate with said hollow shaft but actuable by force applied in pressing said massaging element against the skin to disengage such clutch from cooperative engagement with said first mentioned shaft to thereby interrupt the rotation of said massaging element while maintaining suction through said hollow shaft and said hollow massaging element.

In testimony whereof I affix my signature.

LEV A. MEKLER.